US012585070B2

(12) United States Patent
    Li

(10) Patent No.:     US 12,585,070 B2
(45) Date of Patent:       Mar. 24, 2026

(54) MULTI-GANG ADAPTER FOR HIGH-DENSITY ASSEMBLY

(71) Applicant: Huizhou Fibercan Industrial Co., Ltd, Huizhou (CN)

(72) Inventor: Yaole Li, Huizhou (CN)

(73) Assignee: Huizhou Fibercan Industrial Co., Ltd, Huizhou (CN)

( * ) Notice: Subject to any disclaimer, the term of this patent is extended or adjusted under 35 U.S.C. 154(b) by 436 days.

(21) Appl. No.: 18/198,468

(22) Filed: May 17, 2023

(65) Prior Publication Data

US 2024/0369778 A1      Nov. 7, 2024

(30) Foreign Application Priority Data

May 6, 2023    (CN) ......................... 202310503257.8

(51) Int. Cl.
    *G02B 6/38*              (2006.01)

(52) U.S. Cl.
    CPC ................................. *G02B 6/3825* (2013.01)

(58) Field of Classification Search
    CPC ...................................................... G02B 6/38
    USPC ......................................................... 385/76
    See application file for complete search history.

(56) References Cited

U.S. PATENT DOCUMENTS

| | | | | |
|---|---|---|---|---|
| 5,781,680 | A * | 7/1998 | Womack .............. | G02B 6/3825 385/72 |
| 6,360,050 | B1 * | 3/2002 | Moua ................. | G02B 6/44528 385/136 |
| 6,526,210 | B1 * | 2/2003 | Harrison .............. | G02B 6/3825 385/134 |
| 7,648,286 | B2 * | 1/2010 | Nakagawa ........... | G02B 6/4261 385/92 |
| 8,270,796 | B2 * | 9/2012 | Nhep .................. | G02B 6/3897 385/17 |
| 9,057,859 | B2 * | 6/2015 | Solheid .............. | G02B 6/44528 |
| 9,075,203 | B2 * | 7/2015 | Holmberg .......... | G02B 6/44528 |
| 9,195,013 | B2 * | 11/2015 | Yoshizaki ............ | G02B 6/3869 |
| 9,195,021 | B2 * | 11/2015 | Solheid .............. | G02B 6/44528 |
| 9,671,568 | B2 * | 6/2017 | Yoshizaki ........... | G02B 6/3849 |
| 10,082,636 | B2 * | 9/2018 | Solheid .................. | H04Q 1/06 |

(Continued)

FOREIGN PATENT DOCUMENTS

| | | | | |
|---|---|---|---|---|
| AU | 2013203864 | B2 * | 10/2014 | |
| CN | 102346280 | A  * | 2/2012 | ........... G02B 6/3849 |

(Continued)

*Primary Examiner* — Kaveh C Kianni
(74) *Attorney, Agent, or Firm* — Birchwood IP

(57)            ABSTRACT

The present application discloses a multi-gang adapter for high-density assembly, comprising at least three gangs of optical fiber adapters adjacent to each other in a width direction, the at least three gangs of optical fiber adapters are arranged in steps in the longitudinal direction, a front end and rear end of each optical fiber adapter of the at least three gangs of optical fiber adapters are offset in a longitudinal direction relative to a front end and rear end of adjacent optical fiber adapter. In this way, the optical fiber adapters can be fully offset from each other to facilitate the insertion and removal of optical fiber plugs, and at the same time ensure that each optic fiber adapter can be reasonably assembled and distributed in the 1U distribution box, thereby occupying as little space as possible in the 1U distribution box.

7 Claims, 8 Drawing Sheets

(56)                    References Cited

U.S. PATENT DOCUMENTS

| | | | | |
|---|---|---|---|---|
| 10,247,886 | B2 * | 4/2019 | Rudenick ............. | G02B 6/3893 |
| 10,502,904 | B2 * | 12/2019 | Yang .................... | G02B 6/3825 |
| 11,385,429 | B2 * | 7/2022 | Bolster ............... | G02B 6/3874 |
| 11,609,384 | B2 * | 3/2023 | Milchtein Peltsverger ................. | |
| | | | | G02B 6/3893 |
| 11,635,578 | B2 * | 4/2023 | Claes ................... | G02B 6/4455 |
| | | | | 385/135 |
| 12,265,264 | B2 * | 4/2025 | Gibbs ................. | G02B 6/3831 |
| 2007/0036503 | A1 * | 2/2007 | Solheid ............. | G02B 6/44524 |
| | | | | 385/134 |
| 2008/0175550 | A1 * | 7/2008 | Coburn ............... | G02B 6/4453 |
| | | | | 385/134 |
| 2008/0298763 | A1 * | 12/2008 | Appenzeller ........ | G02B 6/4478 |
| | | | | 385/135 |
| 2009/0214171 | A1 * | 8/2009 | Coburn ............. | G02B 6/44526 |
| | | | | 385/135 |
| 2010/0129028 | A1 * | 5/2010 | Nhep .................. | G02B 6/3825 |
| | | | | 385/59 |
| 2010/0266237 | A1 * | 10/2010 | Holmberg .......... | G02B 6/44528 |
| | | | | 385/24 |
| 2011/0116748 | A1 * | 5/2011 | Smrha ................ | G02B 6/3895 |
| | | | | 385/76 |
| 2012/0051708 | A1 * | 3/2012 | Badar ................. | G02B 6/4453 |
| | | | | 385/135 |
| 2013/0183018 | A1 * | 7/2013 | Holmberg .......... | G02B 6/44528 |
| | | | | 385/135 |
| 2014/0082913 | A1 * | 3/2014 | Marcouiller ......... | G02B 6/3874 |
| | | | | 29/428 |
| 2015/0117820 | A1 * | 4/2015 | Lin ........................ | G02B 6/387 |
| | | | | 385/78 |
| 2015/0309279 | A1 * | 10/2015 | Isenhour ........... | G02B 6/44526 |
| | | | | 385/135 |
| 2017/0359091 | A1 * | 12/2017 | Fukui ....................... | H04B 1/03 |
| 2018/0196204 | A1 * | 7/2018 | Agata ................. | G02B 6/3895 |
| 2019/0235191 | A1 * | 8/2019 | Cooke ............... | G02B 6/44528 |
| 2019/0346632 | A1 * | 11/2019 | Marcouiller .......... | G02B 6/428 |
| 2021/0191059 | A1 * | 6/2021 | Bolster ............. | G02B 6/44528 |
| 2021/0271043 | A1 * | 9/2021 | Geens ............... | G02B 6/44528 |
| 2022/0066116 | A1 * | 3/2022 | Holmberg ........... | G02B 6/4455 |
| 2024/0369793 | A1 * | 11/2024 | Castro ............... | G02B 6/44528 |

FOREIGN PATENT DOCUMENTS

| | | | | | |
|---|---|---|---|---|---|
| CN | 102346281 | A | * | 2/2012 | .......... G02B 6/3825 |
| CN | 202837597 | U | * | 3/2013 | |
| CN | 103543500 | A | * | 1/2014 | |
| CN | 104969107 | A | * | 10/2015 | .......... G02B 6/3825 |
| RU | 2642533 | C2 | * | 1/2018 | .......... G02B 6/3893 |
| TW | M578806 | U | * | 6/2019 | .......... G02B 6/3825 |

* cited by examiner

1

1111

1112

111

MULTI-GANG ADAPTER FOR HIGH-DENSITY ASSEMBLY

CROSS-REFERENCE TO RELATED APPLICATIONS

This application claims the benefit and priority of Chinese patent application No. 202310503257.8, filed on May 6, 2023, disclosure of which is hereby incorporated by reference in its entirety.

TECHNICAL FIELD

The present application relates to a multi-gang adapter for high-density assembly for high-density applications.

BACKGROUND

With the increasing demand for communication bandwidth, optical fibers have been widely used in wired communication networks, outdoor cabinets and other large equipment. The 1U modular 144-core optical fiber distribution box is used for optical network wiring and data center wiring. It is an optical fiber junction device between optical network systems and is usually installed in a network cabinet. It is characterized by high wiring capacity, high density, convenient operation, and reduced floor space for the central computer room. Cost saving is of great significance. In order to reduce the size of the distribution box, the adapters in the distribution box need to be closely arranged. In the prior art, since the front end and the rear end of the adapters are arranged flush in the distribution box, adjacent adapters are very close to each other, it is difficult to unlock with fingers, and it is difficult to plug and unplug the connector. In the existing technology such as application No. 201610638375.X, although the adapters are partly offset, the offset between adjacent adapters is not sufficient, it occupies a relatively large volume of the wiring box, and it is difficult to plug and unplug. The present application makes further improvements on this basis. Moreover, the adapters currently on the market have complex structures, many parts, and are not convenient for automatic assembly, thereby resulting in high overall costs.

SUMMARY

In order to overcome the deficiencies of the prior art, the present application provides a multi-gang adapter for high-density assembly.

In order to solve its technical problems, the technical solution adopted in this application is: A multi-gang adapter for high-density assembly, comprising at least three gangs of optical fiber adapters adjacent to each other in a width direction, wherein the at least three gangs of optical fiber adapters arranged in a steps in a longitudinal direction, wherein a front end of each optical fiber adapter of the at least three gangs of optical fiber adapters is offset by a first depth in the longitudinal direction relative to a front end of an adjacent optical fiber adapter, and a rear end of each optical fiber adapter of the at least three gangs of optical fiber adapters is offset by a second depth in the longitudinal direction relative to a rear end of the adjacent optical fiber adapter, wherein viewed in the longitudinal direction, each of the optical fiber adapters partially overlaps with the adjacent optical fiber adapters, and the first depth is equidistant from the second depth.

In a further technical solution, the optical fiber adapter comprises an adapter body, a front end of the adapter body is provided with a front slot, and a rear end of the adapter body is provided with a first rear slot and a second rear slot, the front slot is provided with a socket, and the socket is provided with an elastic sheet.

In a further technical solution, the front slot comprises a first front slot and a second front slot, wherein a first through hole is provided between the first front slot and the first rear slot, and a second through hole is provided between the second front slot and the second rear slot, the socket comprises a first insert core, a second insert core that are interference fit with the first through hole and the second through hole respectively, and a base body sleeved on outside of the first insert core and the second insert core and assembled in the front slot.

In a further technical solution, the front slot is provided with a positioning slot between the first front slot and the second front slot, and the positioning slot is provided with a groove, wherein the base body comprises a bottom surface attached to a bottom surface of the front slot, a partition perpendicular to center of the bottom surface, and a positioning block fixed to the partition and positioned in the positioning slot, wherein the positioning block is provided with a hook positioned in the groove, and the bottom surface is provided with an insert core sleeves sleeved on outside of the first insert core and the second insert core, wherein the partition divides the bottom surface into two parts and divides the front slot into the first front slot and the second front slot, and an upper part of the partition is provided with a locking slot, and the elastic sheet is locked in the locking slot.

In a further technical solution, the elastic sheet comprises a first elastic sheet, a second elastic sheet, and a connecting part connecting the first elastic sheet and the second elastic sheet at the same time, the connecting part comprises an n-type groove, a top post arranged inside a top end of the n-type groove, wherein the first elastic sheet and the second elastic sheet are respectively connected to both sides of the n-type groove to form a herringbone shape, and the connecting part is stuck in the locking slot.

In a further technical solution, the adapter bodies of the at least three gangs of optical fiber adapters are integrally formed.

In a further technical solution, the optical fiber adapter is configured to interconnect LC-type or SC-type optical fiber connectors.

In a further technical solution, the depths of the first depth and the second depth are between 5.5 mm and 6.2 mm.

The beneficial effect of the present application is to provide a multi-gang adapter for high-density assembly, comprising at least three gangs of optical fiber adapters adjacent to each other in a width direction, the at least three gangs of optical fiber adapters are arranged in steps in the longitudinal direction, a front end and rear end of each optical fiber adapter of the at least three gangs of optical fiber adapters are offset in a longitudinal direction relative to a front end and rear end of adjacent optical fiber adapter. In this way, the optical fiber adapters can be fully offset from each other to facilitate the insertion and removal of optical fiber plugs, and at the same time ensure that each optic fiber adapter can be reasonably assembled and distributed in the 1U distribution box, thereby occupying as little space as possible in the 1U distribution box. The adapter main body of the at least three gangs of optical fiber adapters are integrally formed. The molding process is simple, it is convenient for automatic assembly, and the production cost is low. The first elastic sheet and the second elastic sheet respectively extend into the first front slot and the second front slot, when the optical fiber plug is inserted into the first front slot and the second front slot, the first elastic sheet and the second sheet are respectively in contact with the optical fiber plugs to ensure that the optical fiber plugs are more stably inserted into the front slots and ensure stable signal transmission.

DETAILED DESCRIPTION

The following describes the implementation of the present application in conjunction with the accompanying drawings and related embodiments. The implementation of the present application is not limited to the following examples, and the present application relates to relevant necessary components in the technical field, which should be regarded as a known technology in the technical field, which is known and mastered by those skilled in the art.

With reference to FIG. 1 to FIG. 8, the present application is realized like this: A multi-gang adapter for high-density assembly comprises at least three gangs of optical fiber adapters 1 adjacent to each other in a width direction, wherein the at least three gangs of optical fiber adapters 1 arranged in a steps in a longitudinal direction, wherein a front end of each optical fiber adapter 1 of the at least three gangs of optical fiber adapters 1 is offset by a first depth 2 in the longitudinal direction relative to a front end of an adjacent optical fiber adapter 1, and a rear end of each optical fiber adapter 1 of the at least three gangs of optical fiber adapters 1 is offset by a second depth 3 in the longitudinal direction relative to a rear end of the adjacent optical fiber adapter 1, wherein viewed in the longitudinal direction, each of the optical fiber adapters 1 partially overlaps with the adjacent optical fiber adapters 1, and the first depth 2 is equidistant from the second depth 3.

Figure 1:
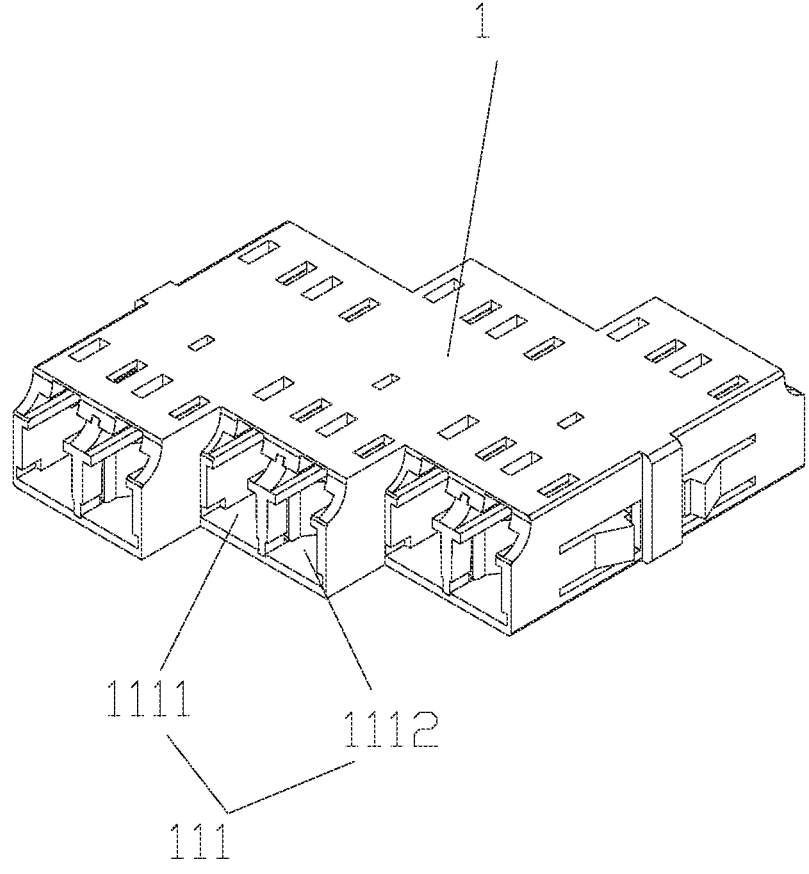
FIG. 1 is a schematic perspective view of the three-dimensional structure of the stepped multi-gang integrated adapter of the present application.
Figure 2:
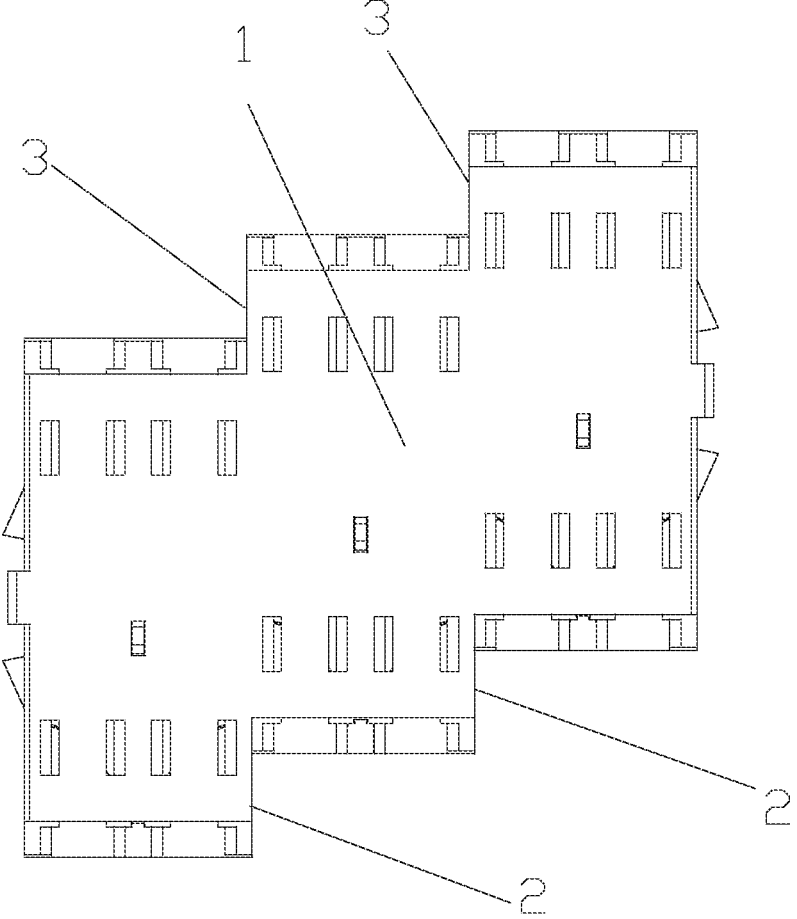
FIG. 2 is a schematic top view of the stepped multi-gang integrated adapter of the present application.
Figure 3:
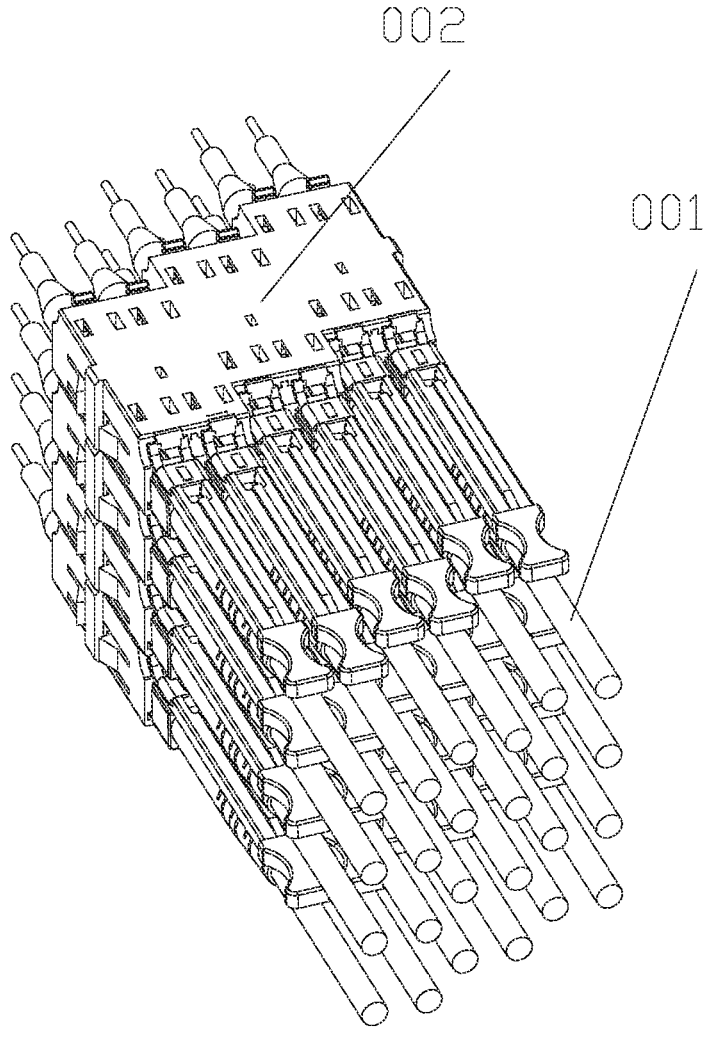
FIG. 3 is a structural schematic diagram of the present application after the stepped multi-gang integrated adapter is docked with the optical fiber connector.
Figure 4:
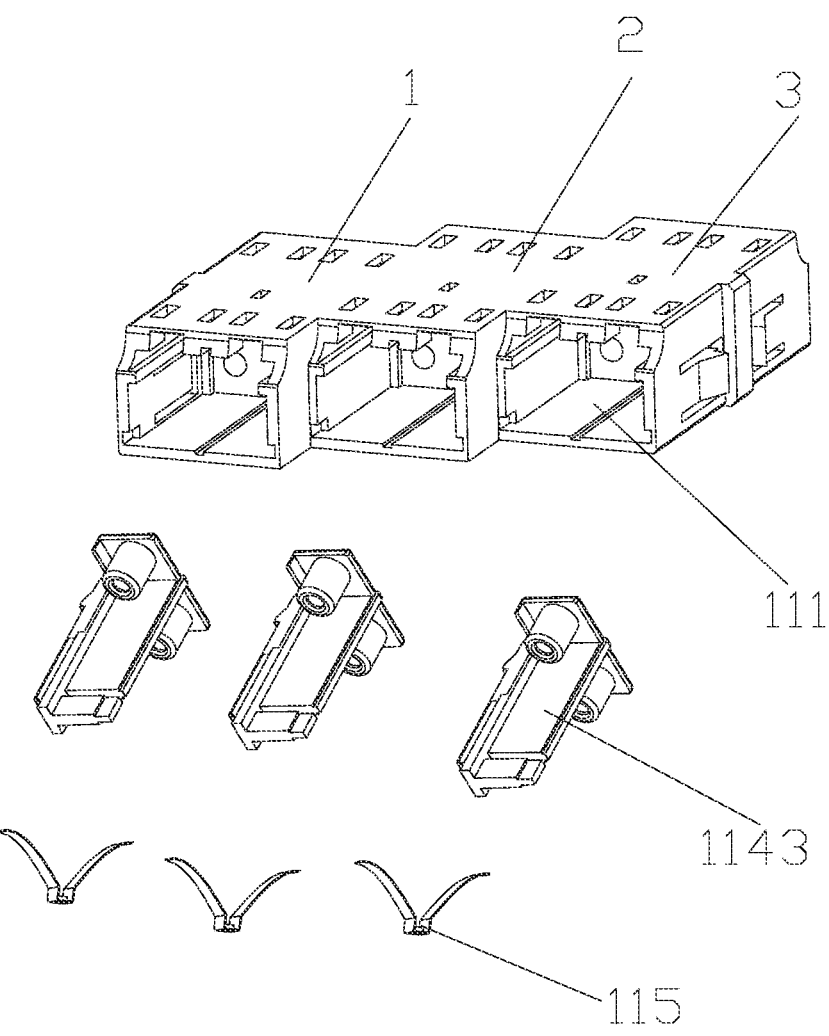
FIG. 4 is a schematic diagram of the exploded structure of the stepped multi-gang integrated adapter of the present application.
Figure 5:
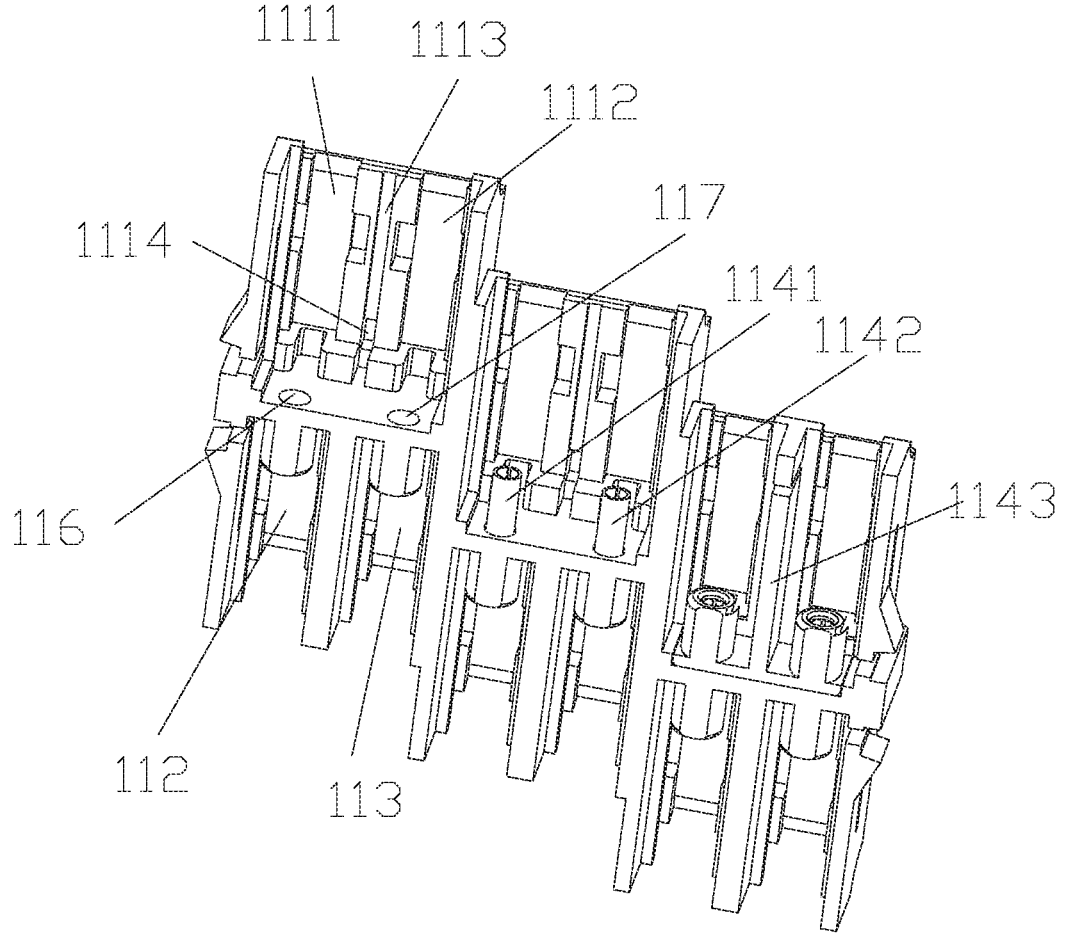
FIG. 5 is a partial structural schematic diagram of the stepped multi-gang integrated adapter of the present application.
Figure 6:
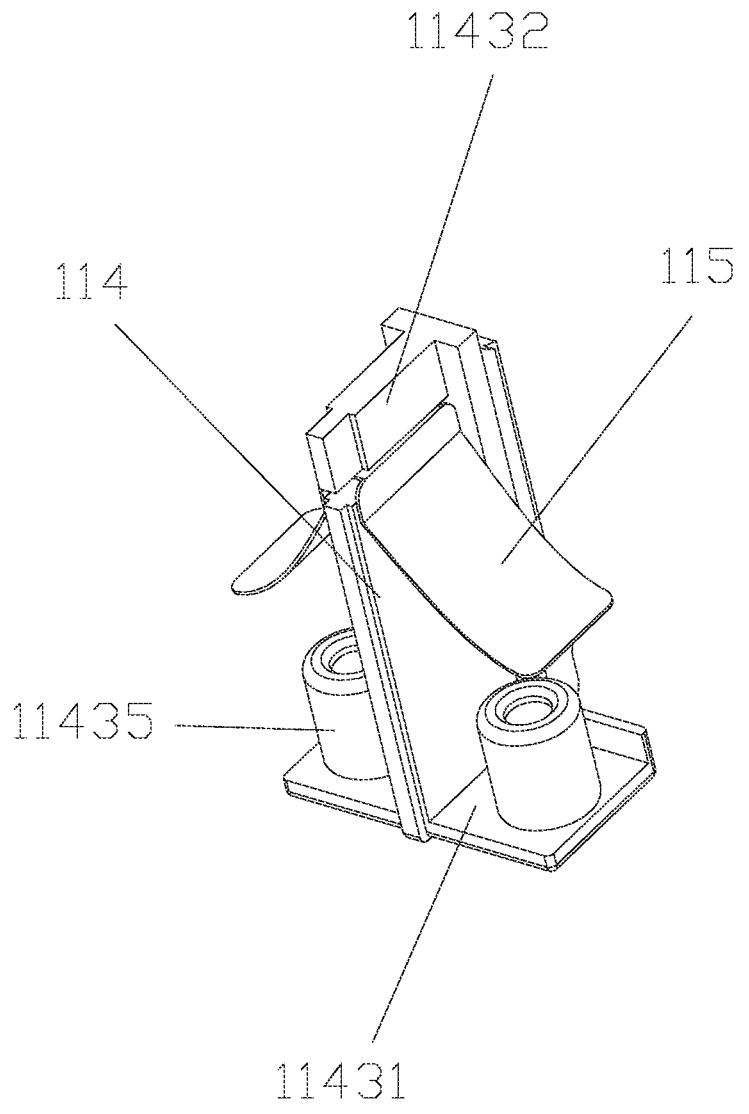
FIG. 6 is a structural schematic diagram of the socket of the stepped multi-gang integrated adapter of the present application.
Figure 7:
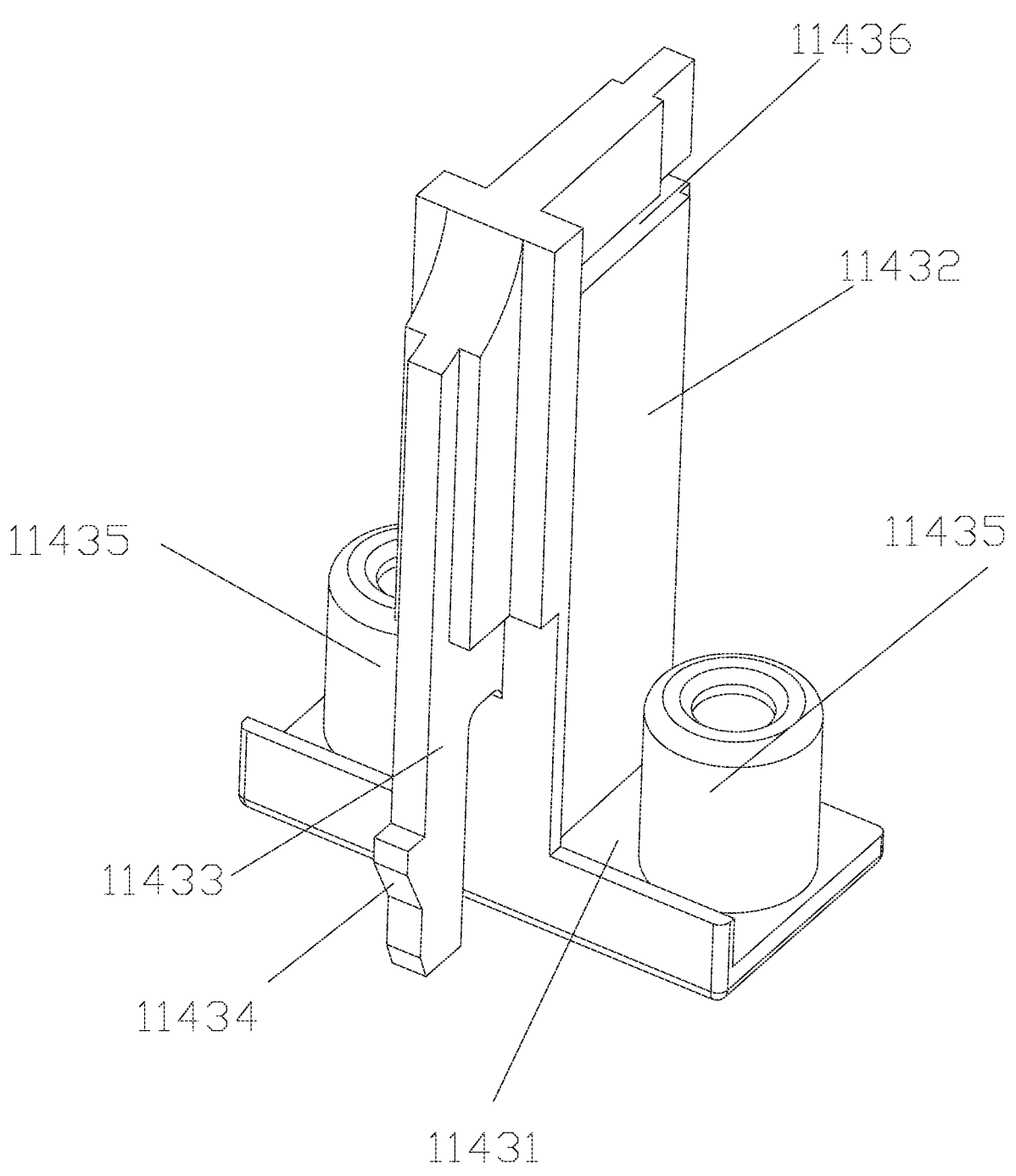
FIG. 7 is a schematic structural diagram of the base body of the stepped multi-gang integrated adapter of the present application.
Figure 8:
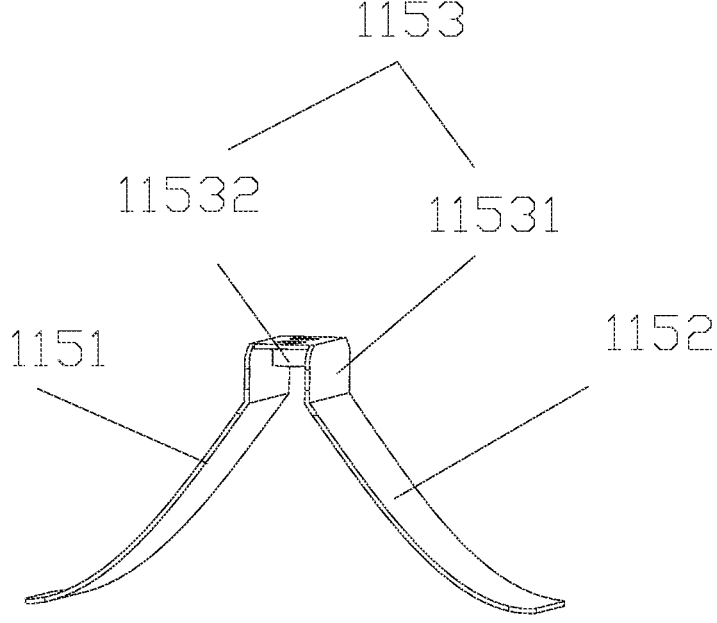
FIG. 8 is a schematic structural diagram of the socket elastic sheet of the elastic sheet of the stepped multi-gang integrated adapter of the present application.

When this application is applied to a 1U distribution box, as shown in FIG. 3, the three gangs of optical fiber adapters 1 are arranged in steps and stacked in four layers to form a optic fiber module 002, and six optic fiber modules 002 are installed in the 1U distribution box. Each of the optical fiber adapters 1 can be inserted into two optical fiber plugs 001, so 144 optical fibers can be inserted into a 1U distribution box. The front end and the rear end of each optic fiber adapter 1 are offset to ensure that each optic fiber adapter 1 is installed at a certain angle and fully offset to facilitate the insertion and removal of the optic fiber plug 001, while ensuring that each optical fiber adapter 1 can be reasonably assembled and distributed in a 1U distribution box, thereby occupying as little space as possible in the 1U distribution box.

The first depth 2 and the second depth 3 are set to 5.84 MM, which can not only make each optic fiber adapter 1 fully offset to facilitate the insertion and removal of the optic fiber plug 001, but also ensure that each optic fiber adapter 1 can be reasonably assembled and distributed in a 1U distribution box, it occupies as little space as possible in the 1U distribution box, which is suitable for high-density assembly in the 1U distribution box.

On the basis of the above embodiments, as a further preference, the optical fiber adapter 1 comprises an adapter body 11, a front end of the adapter body 11 is provided with a front slot 111, and a rear end of the adapter body 11 is provided with a first rear slot 112 and a second rear slot 113, the front slot 111 is provided with a socket 114, and the socket 114 is provided with an elastic sheet 115.

The optical fiber plug 001 is inserted into the front slot 111 and the rear slot respectively, and the optical fiber plug 001 in the front slot 111 is connected with the optical fiber plug 001 in the first rear slot 112 and the second rear slot 113 for signal processing. For transmission, the elastic sheet 115 is in contact with the optical fiber plug 001 to ensure that the optical fiber plug 001 is more stably inserted into the front slot 111 and to ensure stable signal transmission.

On the basis of the above embodiments, as a further preference, the front slot 111 comprises a first front slot 1111 and a second front slot 1112, wherein a first through hole 116 is provided between the first front slot 1111 and the first rear slot 112, and a second through hole 117 is provided between the second front slot 1112 and the second rear slot 113, the socket 114 comprises a first insert core 1141, a second insert core 1142 that are interference fit with the first through hole 116 and the second through hole 117 respectively, and a base body 1143 sleeved on outside of the first insert core 1141 and the second insert core 1142 and assembled in the front slot 111.

The base body 1143 divides the front slot 111 into a first front slot 1111 and a second front slot 1112 for the optical fiber socket 114 to enter. The first rear slot 112 and the second rear slot 113 are used for inserting the optical fiber socket 114. The optic fiber socket 114 in the first front slot 1111 is connected to the optic fiber socket 114 in the first rear slot 112 through the first insert core 1141 for signal transmission. The optic fiber socket 114 in the second front slot 1112 is connected to the optic fiber socket 114 in the second rear slot 113 through the second insert core 1142 for signal transmission.

On the basis of the above embodiments, as a further preference, the front slot 111 is provided with a positioning slot 1113 between the first front slot 1111 and the second front slot 1112, and the positioning slot 1113 is provided with a groove 1114, wherein the base body 1143 comprises a bottom surface 11431 attached to a bottom surface of the front slot 111, a partition 11432 perpendicular to center of the bottom surface 11431, and a positioning block 11433 fixed to the partition 11432 and positioned in the positioning slot 1113, wherein the positioning block 11433 is provided with a book 11434 positioned in the groove 1114, and the bottom surface 11431 is provided with an insert core sleeves 11435 sleeved on outside of the first insert core 1141 and the second insert core 1142, wherein the partition 11432 divides the bottom surface 11431 into two parts and divides the front slot 111 into the first front slot 1111 and the second front slot 1112, and an upper part of the partition 11432 is provided with a locking slot 11436, and the elastic sheet 115 is locked in the locking slot 11436.

The bottom surface 11431 is socketed on the outer side of the insert core, and the partition 11432 divides the front slot 111 into a first front slot 1111 and a second front slot 1112. The positioning block 11433 is positioned in the positioning slot 1113, and the hook 11434 is positioned in the groove 1114 to position the base body 1143 in the front slot 111. The elastic sheet 115 is stuck in the locking slot 11436 so that the elastic sheet 115 can enter the first front slot 111 and the second front slot 1112 on the left and right sides of the partition 11432.

On the basis of the above embodiments, as a further preference, the elastic sheet 115 comprises a first elastic sheet 1151, a second elastic sheet 1152, and a connecting part 1153 connecting the first elastic sheet 1151 and the second elastic sheet 1152 at the same time, the connecting part 1153 comprises an n-type groove 11531, a top post 11532 arranged inside a top end of the n-type groove 11531, wherein the first elastic sheet 1151 and the second elastic sheet 1152 are respectively connected to both sides of the n-type groove 11531 to form a herringbone shape, and the connecting part 1153 is stuck in the locking slot 11436.

The top end of the n-type groove 11531 and the top post 11532 are stuck in the locking slot 11436 to fix the elastic sheet 115 in the locking slot 11436. The two sides of the n-type groove 11531 limit the top of the partition 11432 to the inner side of the n-type groove 11531 to ensure that the elastic sheet 115 can be fixed more stably. The first elastic sheet 1151 and the second elastic sheet 1152 respectively extend into the first front slot 1111 and the second front slot 1112, when the optical fiber plug 001 is inserted into the first front slot 1111 and the second front slot 1112, the first elastic sheet 1151 and the second elastic sheet 1152 are respectively in contact with the optical fiber plug 001 to ensure that the optical fiber plug 001 is more stably inserted into the front slot 111 and to ensure stable signal transmission.

On the basis of the above embodiments, as a further preference, the adapter bodies 11 of the at least three gangs of optical fiber adapters 1 are integrally formed.

The molding process is simple, it is convenient for automatic assembly, and the production cost is low.

On the basis of the above embodiments, as a further preference, the optical fiber adapter 1 is configured to interconnect LC-type or SC-type optical fiber connectors. Cover the field of optical fiber transmission signal for signal transmission.

On the basis of the above embodiments, as a further preference, the depths of the first depth 2 and the second depth 3 are between 5.5 mm and 6.2 mm. In the present application, the depth of the first depth 2 and the second depth 3 is set to 5.84 mM, which can fully offset the three gangs of optical fiber adapters 1 to facilitate the insertion and removal of the optical fiber plug 001, and at the same time ensure that all optical fiber adapters 1 can be assembled and distributed reasonably in the 1U distribution box, thereby occupying as little space as possible in the 1U distribution box.

The above description is only the preferred implementation of the present application, and it should be pointed out that for those skilled in the art, without departing from the principle of the present application, some improvements and modifications can also be made, and these improvements and modifications should also be regarded as the protection scope of the present application.

What is claimed is:

1. A multi-gang adapter for high-density assembly, comprising at least three gangs of optical fiber adapters adjacent to each other in a width direction, wherein the at least three gangs of optical fiber adapters arranged in a steps in a longitudinal direction, wherein a front end of each optical fiber adapter of the at least three gangs of optical fiber adapters is offset by a first depth in the longitudinal direction relative to a front end of an adjacent optical fiber adapter, and a rear end of each optical fiber adapter of the at least three gangs of optical fiber adapters is offset by a second depth in the longitudinal direction relative to a rear end of the adjacent optical fiber adapter, wherein viewed in the longitudinal direction, each of the optical fiber adapters partially overlaps with the adjacent optical fiber adapters, and the first depth is equidistant from the second depth;

wherein the optical fiber adapter comprises an adapter body, a front end of the adapter body is provided with a front slot;

the front slot is provided with a socket, and the socket is provided with an elastic sheet;

wherein the elastic sheet comprises a first elastic sheet, a second elastic sheet, and a connecting part connecting the first elastic sheet and the second elastic sheet at the same time, the connecting part comprises an n-type groove, a top post arranged inside a top end of the n-type groove, wherein the first elastic sheet and the second elastic sheet are respectively connected to both sides of the n-type groove to form a herringbone shape, and the connecting part is stuck in the locking slot.

2. The multi-gang adapter for high-density assembly according to claim 1, wherein a rear end of the adapter body is provided with a first rear slot and a second rear slot.

3. The multi-gang adapter for high-density assembly according to claim 2, wherein the front slot comprises a first front slot and a second front slot, wherein a first through hole is provided between the first front slot and the first rear slot, and a second through hole is provided between the second front slot and the second rear slot, the socket comprises a first insert core, a second insert core that are interference fit with the first through hole and the second through hole respectively, and a base body sleeved on outside of the first insert core and the second insert core and assembled in the front slot.

4. The multi-gang adapter for high-density assembly according to claim 3, wherein the front slot is provided with a positioning slot between the first front slot and the second front slot, and the positioning slot is provided with a groove, wherein the base body comprises a bottom surface attached to a bottom surface of the front slot, a partition perpendicular to center of the bottom surface, and a positioning block fixed to the partition and positioned in the positioning slot, wherein the positioning block is provided with a hook positioned in the groove, and the bottom surface is provided with an insert core sleeves sleeved on outside of the first insert core and the second insert core, wherein the partition divides the bottom surface into two parts and divides the front slot into the first front slot and the second front slot, and an upper part of the partition is provided with a locking slot, and the elastic sheet is locked in the locking slot.

5. The multi-gang adapter for high-density assembly according to claim 3, wherein the adapter bodies of the at least three gangs of optical fiber adapters are integrally formed.

6. The multi-gang adapter for high-density assembly according to claim 1, wherein the optical fiber adapter is configured to interconnect LC-type or SC-type optical fiber connectors.

7. The multi-gang adapter for high-density assembly according to claim 1, wherein the depths of the first depth and the second depth are between 5.5 mm and 6.2 mm.

* * * * *